United States Patent [19]

Schnell et al.

[11] Patent Number: 4,575,629
[45] Date of Patent: Mar. 11, 1986

[54] DETECTOR FOR RAMAN SPECTRA AND OTHER WEAK LIGHT

[75] Inventors: Robert P. Schnell, Deerfield; Robert W. Sampson, Wayne; Ronald F. Pancanowski, Hoffman Estates; Donald J. Bruggema, Wheeling, all of Ill.

[73] Assignee: UOP Inc., Des Plaines, Ill.

[21] Appl. No.: 566,843

[22] Filed: Dec. 29, 1983

[51] Int. Cl.[4] ............................................. H01J 7/24
[52] U.S. Cl. ................................ 250/238; 62/514 R; 250/352; 356/301
[58] Field of Search ............... 356/301; 250/352, 578, 250/238, 213 VT; 62/514 R

[56] References Cited

U.S. PATENT DOCUMENTS

| | | | |
|---|---|---|---|
| 2,527,121 | 10/1950 | Dudenbostel | 356/301 |
| 2,527,122 | 10/1950 | Heigl et al. | 356/301 |
| 2,940,355 | 6/1960 | Cary | 356/301 |
| 3,414,354 | 12/1968 | Siegler | 356/301 |
| 3,556,659 | 1/1971 | Hawes | 356/301 |
| 3,625,613 | 12/1971 | Abell et al. | 356/301 |
| 3,723,007 | 3/1973 | Leonard | 356/301 |
| 3,820,897 | 6/1974 | Roess | 356/301 |
| 3,851,173 | 11/1974 | Taylor et al. | 250/352 X |
| 4,030,827 | 6/1977 | Delhaye et al. | 356/301 |
| 4,068,953 | 1/1978 | Harney et al. | 356/301 |
| 4,127,329 | 11/1978 | Chang et al. | 356/301 |
| 4,194,119 | 3/1980 | MacKenzie | 250/352 |
| 4,195,930 | 4/1980 | Delhaye et al. | 356/301 |
| 4,270,864 | 6/1981 | Barrett et al. | 356/301 |
| 4,324,104 | 4/1982 | Horn et al. | 250/352 X |
| 4,397,556 | 8/1983 | Müller | 356/301 |

OTHER PUBLICATIONS

Savage et al., *Applied Optics*, vol. 10, No. 14, Apr. 1971, pp. 965–968.
Willetts et al, *Journal of Raman Spectroscopy*, vol. 2, No. 3, Jun. 1974, pp. 249–256.
Albert et al, *Chem, Biomed, and Environ. Instrumentation* vol. 10, No. 4, 1980, pp. 339–351.
Analytical Chemistry, vol. 21, No. 5, May 1949, pp. 554–559, "Determination of Total Olefins and Total Aromatics" by J. J. Heigl et al.
Proceedings of the American Petroleum Institute, vol. 27–28, 1948, pp. 95–105, "Determination of Total Olefins and Total Aromatics" by J. J. Heigl et al.
Report of a conference held by the Institute of Petroleum in London on Oct. 28–29, 1954, entitled "Molecular Spectroscopy".

*Primary Examiner*—F. L. Evans
*Attorney, Agent, or Firm*—Thomas K. McBride; William H. Page II; Richard J. Cordovano

[57] ABSTRACT

Apparatus for converting weak light, or light of low intensity, to electrical signals descriptive of such light. The apparatus is capable of sensing differences in photon flux over an area of detection, that is, sensing a pattern of lighter and darker areas. An important application of the apparatus is in spectroscopy and spectroscopic anaylsis, where it is desired to record a spectrum in other than visual form.

9 Claims, 5 Drawing Figures

DETECTOR FOR RAMAN SPECTRA AND OTHER WEAK LIGHT

BACKGROUND OF THE INVENTION

This invention relates to converting weak light to electrical signals descriptive of the light, where the light varies in intensity over an area of detection. A particular application is in qualitative and quantitative analysis utilizing Raman spectra of the substances under analysis, the invention being useful in converting spectra to non-visual form.

The Raman effect, or Raman scattering, is well known. Briefly and simply, when a beam of light impinges on substances, light is scattered. This scattering is of several different types, the predominant type being Rayleigh scattering, wherein the wave length of the scattered light is the same as that of the incident light. In the type utilized in the present invention, Raman scattering, the scattered light is of different wave lengths than the incident light; photons are absorbed by the substance and re-emitted at higher and lower wave lengths. A Raman spectrum of a substance is constituted of Raman scattered light and is spread across a wave length band even if the incident light is monochromatic, that is, all of a single wave length. There is a separate Raman spectrum of a particular substance for, or associated with, each incident wave length. In practice, a monochromatic beam of incident light is always used in Raman spectroscopy because of the difficulties in obtaining spectral separation. When Raman and Rayleigh scattered light is resolved into a spectrum by a spectrograph, Raman lines will appear on both sides of the Rayleigh line. The Raman line or lines on the low frequency side (or low wave number side or high wave length side) of the Rayleigh line are more intense than those on the high frequency side and are called the Stokes line or lines; those on the high frequency side are called the anti-Stokes line or lines. Not all substances are Raman active; there must be a change in polarizability during molecular vibration in order that a substance be Raman active. Substances which do exhibit Raman spectra can be characterized by means of their spectra. Qualitative analysis of a substance can be accomplished by comparison of the locations of its Raman lines with those of known standards. Quantitative analysis can be accomplished by comparison of intensities of Raman lines; this is generally a linear relationship. Of course, spectra which are compared must result from exciting radiation of the same wave length. The present invention comprises apparatus capable of converting Raman spectra to electrical signals descriptive of the spectra.

Raman spectroscopy has numerous applications and is a major research tool. It is now a rapidly developing area, having been neglected for many years in favor of infrared spectroscopy and ultraviolet spectroscopy. Advances in the equipment available for Raman spectroscopy, particularly the development of lasers as a source of monochromatic light, have provided much impetus. A review of the field of Raman spectroscopy, including theory, applications, potential, and citations to additional literature is provided by two recent publications: *Raman Spectroscopy*, Long, McGraw-Hill, 1977 and *Chemical Applications of Raman Spectroscopy*, Grasselli et al., Wiley and Sons, 1981.

Though Raman spectroscopy is an important research technique and is used for qualitative and quantitative analysis, there has not been available a Raman analyzer, that is, apparatus which provides, rather than a spectrum, an output comprising indication of substances present in a sample and, in the case of a quantitative analyzer, numbers denoting the amounts present of the constituent substances of a sample. There has not been available a routine method of analysis utilizing the Raman effect which provides qualitative or quantitative results which need no further processing or interpretation. Further lacking has been universal Raman effect apparatus and methods; that is, those that can be used for a wide variety of samples without significant change to the apparatus being required when different substances are to be analyzed. There are significant advantages in effecting qualitative and/or quantitative analysis using Raman spectroscopy in place of or in addition to conventional analysis methods.

The present invention has features which make it particularly useful in apparatus for performing analyses using the Raman effect in addition to being useful in other applications where light patterns are sensed and converted to non-visual form.

INFORMATION DISCLOSURE

U.S. Pat. No. 4,068,953 (Harney et al.) deals with methods and apparatus for measuring isotope ratios and isotopic abundances using the Raman effect. Apparatus for remote sensing of gaseous materials is described in U.S. Pat. Nos. 3,820,897 (Roess) and 3,625,613 (Abell) and an improvement to the latter patent is disclosed in U.S. Pat. No. 3,723,007 (Leonard).

U.S Pat. Nos. 3,414,354 (Siegler) and 3,556,659 (Hawes) describe laser-excited Raman spectrometers. A Raman microprobe for producing micrographic images of certain species in a sample is disclosed in U.S. Pat. No. 4,195,930 (Delhaye et al.). An earlier patent of the same inventors covering similar subject matter is U.S. Pat. No. 4,030,827.

Work accomplished using the Raman effect to analyze hydrocarbons is disclosed in U.S. Pat. Nos. 2,527,121 (Dudenbostel) and 2,527,122 (Heigl et al.) and in an article by Heigl et al. entitled "Determination of Total Olefins and Total Aromatics" which appeared in both *Analytical Chemistry* (Vol. 21, p. 554, 1949) and *Proceedings of the American Petroleum Institute* (Vol. 27-28, p. 90, 1948). Another reference covering the same work is the report of a conference held by The Institute of Petroleum in London in 1954 entitled "Molecular Spectroscopy".

Additional U.S. patents dealing with Raman spectroscopy are U.S. Pat. Nos. 4,127,329 (Chang et al.) and 2,940,355 (Cary). U.S. Pat. No. 4,270,864 (Barrett et al.) is representative of several patents to Barrett dealing with photoacoustical Raman spectroscopy.

U.S. Pat. No. 4,397,556 (Muller) claims method and apparatus for quality control in which the Raman effect is used.

BRIEF SUMMARY OF THE INVENTION

It is an object of this invention to provide apparatus for converting weak light, such as that of a Raman spectrum, to electrical signals descriptive of the weak light. Such apparatus is often called a detector. The term weak indicates that the light is of relatively low intensity. As discussed herein, a Raman spectrum may be described as a pattern of low intensity light with differences in photon flux over an area exhibiting an image of the pattern, which may be referred to as an area of detection. Flux is defined as the rate of transfer of photons across a given surface. The apparatus of the invention is capable of sensing differences in photon flux over an area of detection; that is, a pattern of lighter and darker areas. It is emphasized that the present invention is useful for applications other than that described in detail herein, such applications being quite familiar to those skilled in the art.

In a broad embodiment the invention comprises (a) a housing to contain elements comprising the detector, the housing having an entrance aperture through which photons pass; (b) means for sensing the number of photons passing through said aperture, said photon sensing means being comprised of a plurality of sensing elements, where each element provides an intermittent electrical signal corresponding to the total number of photons incident upon it over a time period; (c) means for holding in position and adjusting the position of said photon sensing means comprising, in cooperative combination: (i) a board to which said photon sensing means are affixed, the board having an opening in its center area and a plurality of tie rod openings; (ii) a plurality of tie rods affixed at one end to the housing, each tie rod slidably passing through one of said tie rod openings in the board and being normal to the board, and at least a portion of the tie rods having retaining means at their non-affixed ends; (iii) first elastic expansive means located between the board and said retaining means, said first elastic expansive means urging the board toward said entrance aperture; and, (iv) a plurality of alternate tie rod attachment points on the housing, such that the board may be adjusted in the plane in which it lies by repositioning one or more tie rods to an alternate attachment point or to an alternate attachment point and another tie rod opening; (d) means for removing heat from the detector or converting apparatus; and, (e) means for providing a heat sink and a thermal path to said heat removal means comprising, in cooperative combination: (i) a first cold plate and a second cold plate disposed within the housing, each cold plate having one of its two major surfaces partially covered by a series of ridges parallel to one another with valleys being formed between the ridges, with the ridges being disposed and dimensioned in such a manner that the ridges of the first cold plate are interleaved with the ridges of the second cold plate to at least partially fill the valleys of each plate and provide substantial contact between the plates, and with the first cold plate having a projection extending from its unridged major surface toward the photon sensing means; (ii) a plurality of tie rods, each tie rod having one end affixed to a cold plate, all tie rods being affixed to the same cold plate, and each rod slidably passing through an opening in the other cold plate; and, (iii) second elastic expansive means located between the first and second cold plates, said second elastic expansive means urging the cold plates apart and urging the first cold plate projection into contact with the photon sensing means through said diode board center opening.

DETAILED DESCRIPTION OF THE INVENTION

In order to aid in gaining an understanding of the invention, the apparatus of a particular embodiment, which is used in a hydrocarbon analyzer dedicated to PNA analysis, will be described. The information presented in regard to this embodiment is not meant to limit the scope of the invention in any way. It is necessary to describe the analyzer in detail in order to appreciate the present invention.

The function of a PNA analyzer is to determine the composition of a hydrocarbon in terms of three hydrocarbon groups, as follows. Paraffins are straight or branched chain hydrocarbons with no double bonds. Naphthenes are ring compounds with no double bonds, and with the ring usually containing 5 or 6 carbon atoms. Aromatics are hydrocarbon compounds that contain at least one 6-carbon ring having three double bonds. The PNA analysis of a hydrocarbon is useful information to oil refinery operators; for example, in a catalytic reforming process, the operating conditions are set by reference to the P, N, and A content of the feed stream to the process. The yield of product from the process is dependent on the operating conditions.

Figures 1, 5:
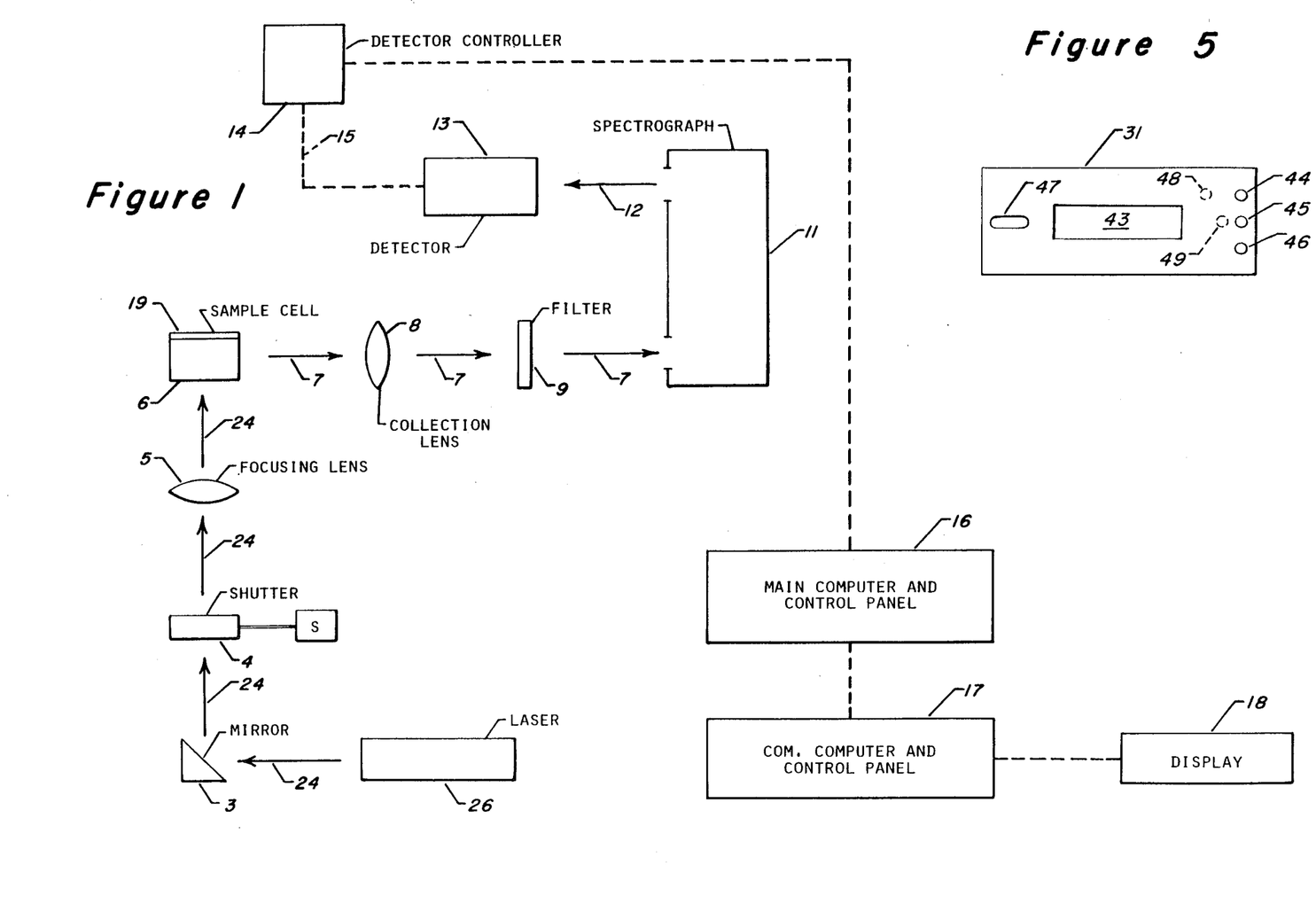
FIG. 1 is a schematic diagram of apparatus used in one embodiment of the invention.
FIG. 5 is a plan view of a diode board used in the detector of FIG. 1.

Referring to FIG. 1, laser 26 is the source of monochromatic radiation, or a narrow beam of photons, which serves as the exciting light for the Raman effect. Laser 26 is a 25 milliwatt helium-neon laser, which produces radiation centered about a wave length of 6328 angstroms. Of course, it is not possible to provide totally monochromatic light; the laser light does not form a single line at 6328 angstroms but forms a band centered on that value which has the appearance of a Gaussian curve. However, if the width of the band, or Gaussian curve, is too great, Raman peaks will not be clearly resolved. The band width of the incident light should be almost as narrow as the finest peak which is to be resolved. More precisely, the width of the laser light band at one-half its maximum height should be no more than the width of the narrowest peak to be resolved. Arrows 24 denote the path of the beam of photons produced by laser 26. The direction of the beam of photons is changed by mirror 3, which is a coated dielectric mirror suitable for a helium-neon laser denoted Laser Beam Director by its supplier, Newport Research Corp. The photon beam passes through shutter 4 and focusing lens 5 before impinging on a sample contained in sample cell 6. The function of shutter 4 is to briefly stop the beam of photons from reaching sample cell 6 so that a background spectrum may be obtained, as will be explained herein. Shutter 4, which was supplied by Newport Research Corp., is opened and closed upon signals from main computer 16 by means of wiring which is not shown.

Focusing lens 5 is an achromatic objective of 60 mm focal length supplied by Rolyn Optics Co. Its purpose is to throttle, or concentrate, the beam of photons so that there is a higher photon flux or energy density impinging on the sample. The diameter of the photon beam before passing through focusing lens 5 is approximately 1.25 mm. The focusing lens is supported in a holder and centering device (not shown) supplied by Ardel-Kinematic of College Point, New York. Sample cell 6 is a rectangular block of stainless steel having a cavity bored through it along its longitudinal axis to serve as a sample flow passage. Four quartz optical flats are disposed around the four sides of the block parallel to its longitudinal axis. The optical flats serve as closures (by means of 0-rings and appropriate fittings) for cavities in the block which communicate with the sample flow passage. Thus the optical flats form "windows" on the sample stream. The photon beam passes through one window and is reflected back by a coating 19 on the opposite window. The coating consists of aluminum vapor deposited on the outside surface and covered by lacquer for protection of the aluminum. The coating reflects the incident radiation so that it impinges a second time on the sample. Raman scattered light passes through the third window to collection lens 8. The fourth window is provided only for viewing the sample and photon beam. A continuous stream of gaseous or liquid sample flows through sample cell 6 via tubing (not shown) connected to the flow passage. Sample flow may be pictured as being perpendicular to the plane in which FIG. 1 lies. It is not necessary that the sample be flowing through sample cell 6; the substance to be analyzed may be contained in a closed container. A flow-through cell is used in the PNA analyzer, since this embodiment of the invention is adapted for on-line use, or continuous analysis of a flowing stream. There are numerous sample cell designs which are capable of use. For an example, see U.S. Pat. No. 4,410,271 (Matthews). Note that a multi-pass cell design will make available more scattered light, but will also require more precise alignment. It should be noted that substances in solid form may also be analyzed, as will be discussed herein, and do not require containment in a sample cell.

Figure 4:
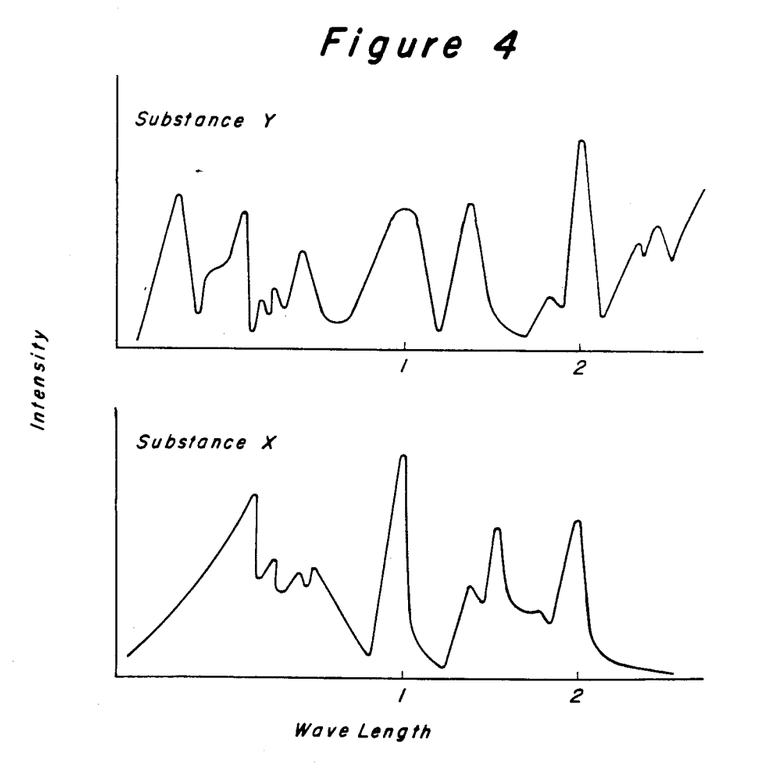
FIG. 4 is a representation of spectra of two different substances, which has been arbitrarily drawn for the purpose of illustration.

Light scattered by the sample is collected and focused by collection lens 8. The collected scattered light may be referred to as a photon stream. The path of the scattered light used in the apparatus is depicted by arrows 7. Collection lens 8 is a Canon f/1.4 50 mm camera lens. The scattered light is focused on the entrance slit of spectrograph 11 by collection lens 8. The function of collection lens 8 may also be accomplished using more than one lens, a mirror or mirrors, or a combination thereof. Filter 9 is provided in the path of the photon stream to block Rayleigh scattered light and the anti-Stokes portion of the Raman scattered light. It is a sharp cut-off filter supplied by Schott Optical Glass which stops substantially all radiation having a wave length less than 6328 angstroms. It is not necessary to the practice of the invention to prevent light blocked by filter 9 from entering spectrograph 11, but it is common practice to exclude unneeded light to prevent potential problems. An alternative arrangement, should it be desired to include a filter, is to locate it between the spectrograph and detector. Spectrograph 11 resolves light entering it into a spectrum by focusing each component wave length of the entering photon stream at a different horizontal position at the spectrograph exit slit. The spectrum appears as a band of spaced-apart (by wave length) vertical lines of light of varying intensity. The spectrum is commonly visualized as, or converted into, a curve having a series of peaks and valleys, such as the representation of FIG. 4. Spectrograph 11 is denoted as Model No. HR-320 by its supplier, Instruments S.A. Inc. of Metuchen, N.J. The spectrum formed at the exit slit of spectrograph 11 is sensed by detector 13, which converts the spectrum to electrical signals and transmits the signals to detector controller 14. A path from spectrograph 11 to detector 13 is depicted by arrow 12 of the schematic representation. Physically, detector 13 is bolted to spectrograph 11, covering the exit slit. As discussed later, detector 13 and detector controller 14 may be viewed as one device for converting weak light to electrical signals, the device being contained in two separate packages in this embodiment.

Figure 2:
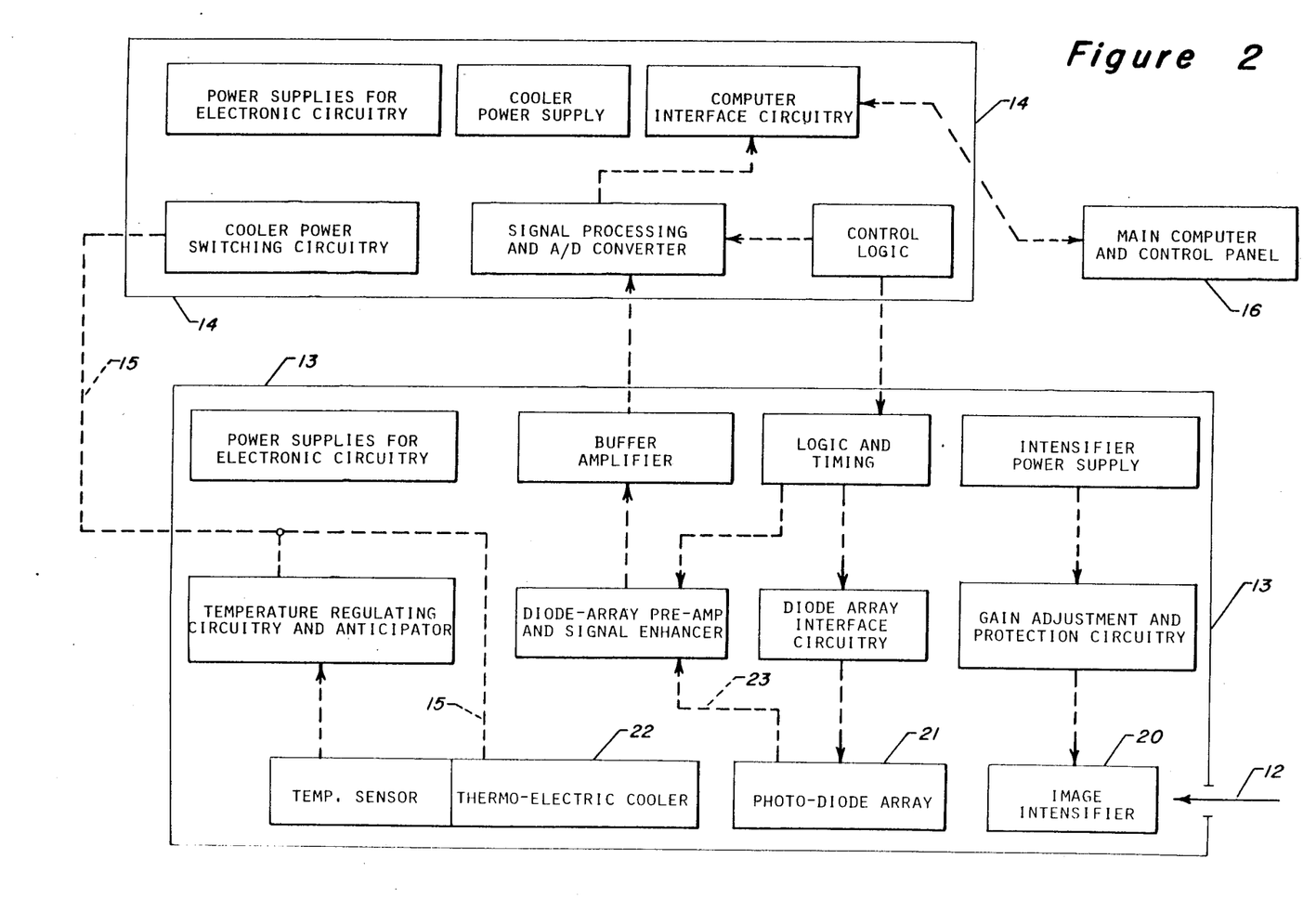
FIG. 2 is a block diagram showing the major components of the detector and detector controller of FIG. 1 in a functional format. Where helpful, signals transmission is depicted.

Information and signal transmittal paths are represented in FIGS. 1 and 2 by means of dashed lines, such as that denoted 15. A dashed line represents a path or paths whose physical form varies according to the type of information and signals, but is usually a wire or wires. Returning to FIG. 1, the signals comprising the spectrum are processed and converted to digital form in detector controller 14 and then transmitted to the main computer, represented by the box denoted 16. Main computer 16 processes the spectrum, as will be described later, and generates a quantitative analysis of the substance flowing through sample cell 6. The analysis is transmitted to communication (com) computer 17, which causes it to appear in human-readable form on display 18, an LED device assembled from commercially available components. Control panels are provided at computers 16 and 17 for human input to the system. The PNA analyzer has two separate computers because it is adapted for on-line use; that is, it is designed to monitor a fluid continuously flowing in a pipeline in an oil refinery or other industrial plant. Main computer 16 is located with the laser and spectrograph in a cabinet near the pipeline. Com computer 17 and display 18 are located in a central control room where operation of the oil refinery or plant is closely monitored. Com computer 17 is provided to facilitate communication between the control room and the pipeline location and to drive display 18.

Figure 3:
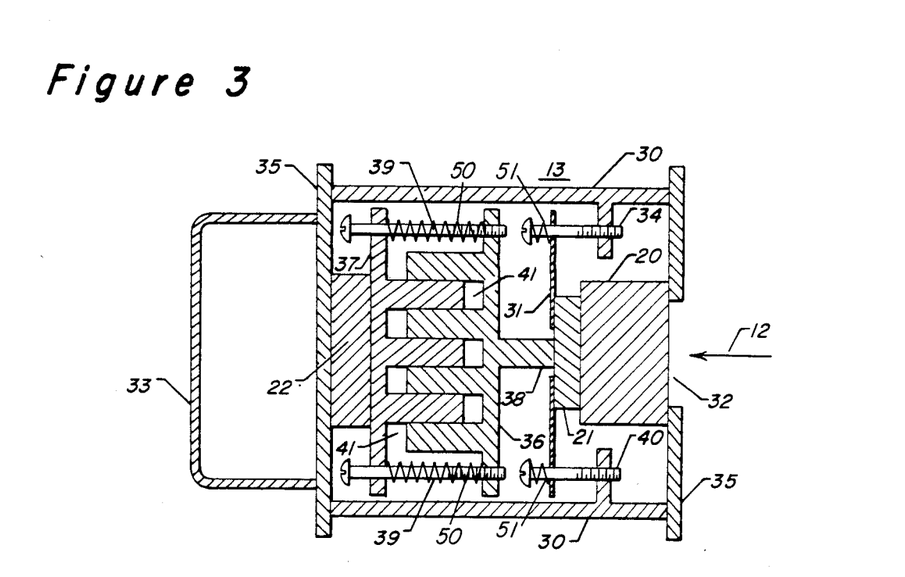
FIG. 3 is a simplified sketch of the detector of FIG. 1 drawn as if it were a cross-sectional view. It is not an engineering drawing and is not complete, but is intended only as an aid in understanding the invention.

Continuing with the description of the PNA analyzer and now referring to FIG. 2, the major functional components of detector 13 and detector controller 14 can be seen. Image intensifier 20 senses the spectrum resolved by spectrograph 11 (FIG. 1) as denoted by arrow 12 (FIGS. 1, 2, and 3). The purpose of image intensifier 20 is to increase the intensity of the spectrum so that it may be sensed by photo-diode array package 21, a photon sensing means, in a reasonably short time, since the intensity of Raman scattered light is low. Image intensifier 20 may be viewed as a device which magnifies light but does not change any other characteristic of the light; for example, for each photon entering the intensifier, 20 photons may be emitted from it. The array package is capable of sensing a spectrum without intensification, but the analysis time would have to be increased. The intensifier is manufactured by Ni-Tec of Niles, Ill. Photo-diode array package 21 senses the intensified spectrum and converts it into a series of electrical signals. Sensing is accomplished by integration of the light striking the array over a short period of time. The array consists of 1024 linear silicon diode elements, each of which is responsive separately to the number of photons striking it. The elements are vertically oriented and side-by-side, each element having a vertical dimension of about 2.5 mm and a horizontal dimension of about 0.025 mm. Each element senses a narrow vertical slice of the spectrum band. The total width of the 1024 elements is approximately 25.6 mm. The cover plates of both the intensifier and the array package which are adjacent to one another, comprise fiber optic bundles. Use of the bundles is an important feature, as will be explained later. The array package is manufactured by E. G. and G. Reticon (Model 1024SF) of Sunnyvale, Calif. Thermo-electric cooler 22 is provided to cool photodiode array package 21 and other components of the detector. It is supplied by Borg-Warner Thermoelectrics. The balance of the functional blocks of FIG. 2 are self-explanatory to those skilled in the art, comprising electronic apparatus for accomplishing the functions of providing electric power to operate the converting apparatus, communicating Swith a computer, controlling temperature of the converting apparatus, controlling read-out of said intermittent electrical signals, conditioning signals, and controlling operation of the converting apparatus.

Additional description of photo-diode array package 21 is as follows. Each diode element, or cell, consists of a photo-diode and a dummy diode, both with an associated storage capacitance. These diodes are connected through MOS multiplex switches to video and dummy recharge lines. The multiplex switches are turned on and off in sequence by shift register scanning circuits, thereby periodically recharging each cell to 5 volts and storing a charge on its capacitance. The shift registers are driven by multiphase clocks with periodic start pulses being introduced to initiate each scan of the cells. Integration time is the interval between start pulses. During this integration time, the charge on each capacitor is removed by the reverse current flowing in its associated diode. In the PNA analyzer, it usually requires about 5 to 10 seconds for the diode discharge step, that is, the step of sensing photons to accumulate data which is read out in a single scan. There are two components to the reverse current, photocurrent and dark current leakage. Photo-current results from the light falling on the photo-diode. The dummy diode is not exposed to light and its purpose is to permit dark current leakage and other false information to be subtracted out. Use of the output of the dummy diodes is optional in the practice of the invention, as is explained herein. If the dummy diode output is used, the subtraction is accomplished "on the fly". During readout, or scan, of the diodes, the outputs of both the photo-diodes and the dummy diodes are sent to a differential amplifier which is part of the detector electronics and which accomplishes the subtraction.

The significant features of detector 13 are shown in FIG. 3. Image intensifier 20 is mounted in metal housing 30. Entrance aperture or opening 32 is provided so that intensifier 20 may receive the spectrum resolved by spectrograph 11. Opening 32 is covered by a light-transparent material (not shown). In an alternative arrangement, filter 9 (FIG. 1) could be placed at opening 32. An elastic silicone compound (not shown) fills a portion of the space between housing 30 and the circumference of image intensifier 20. Photo-diode array package 21 is mounted on diode board 31 (FIG. 5), which provides foil tracks to serve as conductors from the pins of photo-diode array package 21 in addition to serving as a holder for the array package. Wires (not shown) are soldered to the foil tracks to connect array package 21 with a preamplifier and signal enhancer, which is physically located inside electronics enclosure 33 attached to the back of housing 30. Referring briefly to FIG. 2, the wires are represented by dashed line 23. Returning to FIG. 3, diode board 31 is held in place by tie rods denoted 34 and 40, which are machine screws in this embodiment. Elastic expansive means, which in this embodiment are cylindrical springs 51 enclose screws 34 and 40 between diode board 31 and the heads of the screws such that pressure is exerted on the diode board which urges photo-diode array package 21 toward the entrance aperture and into contact with intensifier 20.

The intensifier and array package must be in alignment so that the spectrum image is properly oriented on the diodes. Adjustment of diode board 31 in its own plane in a horizontal direction is provided by means of placement of screw 34. (Note that the diode board is shown rotated by 90° in FIG. 3 for ease of drawing.) Referring to FIG. 5, there are three holes, 44, 45, and 46, in diode board 31 at one end, only one of which is used at a time for screw 34. There are three tapped holes in the body of the housing to accept screw 34, one corresponding to each hole of the diode board. The positions of two of the holes in the housing are shown in FIG. 5 by the dashed circles having reference numbers 48 and 49. The third housing hole may be visualized as being under diode board hole 46. Both sets of holes are arranged so that each set falls on a single straight line, but the straight lines form an angle with one another, so that moving screw 34 from one position to another causes the diode board to move horizontally. A horizontal slot 47 at the other end of the board accommodates the movement, screw 40 at that end being placed in the slot (or slots). It can be visualized from FIG. 5 that lining up hole 45 with the tapped housing hole represented by 49 causes a horizontal movement of board 31. It can be seen that adjustment of board 31 in a rotary manner can be accomplished by repositioning screw 34 to an alternate attachment point and a tie rod opening not corresponding with it, for example, by aligning hole 44 with hole 49. This embodiment shows only two tie rods and a small number of tie rod holes; certain applications may require a larger number. If there is a vertical misalignment between the intensifier and array package, a mirror in spectrograph 12 can be adjusted to shift the image in the vertical direction. The intensifier is large enough to accommodate the image shift. The intensifier can also be rotated with respect to the array package; this is advantageous, for example, if a portion of the intensifier is suspected of malfunction. Between intensifier 20 and array package 21 is a coating of refractive index matching fluid (not shown) of refractive index 1.5. The fluid, which may be described as a grease, is supplied by Cargille Laboratories of Cedar Grove, N.J.

The arrangement of intensifier 20 and diode array 21 and the use of an index matching fluid is quite significant. Light emitted from the interior of the intensifier passes through the fiber optic bundle which comprises the intensifier back cover plate, through the index matching fluid, and through the fiber optic bundle comprising the cover plate of the diode array package. This arrangement avoids the loss of resolution and intensity which would take place were the light comprising the spectrum to pass through media having significantly different indices of refraction, as the index fluid was chosen to have an index of refraction substantially the same as that of the fiber optic bundles. Detectors which might have been purchased utilize a lens to focus light onto a sensing device, such as the diode array package;

use of a lens causes a loss of sharpness. An analogy involving viewing an image on a television screen is helpful in appreciating the benefits of the above-described arrangement. In a darkened room, a wall parallel to a TV screen will show a blur of light. If an appropriate lens is placed between the screen and the wall, an image will be seen on the wall. The image on the wall will be dimmer and less sharp than the image on the TV screen. Likewise, the image on the array package would be degraded if a lens were used between the array package and intensifier. If it were possible to place tubes having light-impenetrable walls and not susceptible to internal reflections between each "dot" of a TV screen and points on the retina of a viewer's eye, the image seen would be much sharper and more intense than that seen when the image is focused on the retina by the cornea (lens) of the eye after the light has passed through the air between TV set and eye. The tubing, of course, is analogous to the light-conducting fibers of a fiber optic bundle. Thus the arrangement of the two fiber optic bundles with a coating of index fluid and butted against each other serves to transfer the spectrum directly to the diodes, with little loss of intensity and little loss of resolution or spreading of the light. Impingement on more diodes solely because of the optical system is minimized.

Returning to FIG. 3, thermo-electric cooler 22 is mounted on backplate 35 of housing 30. Provided to serve as a thermal path between cooler 22 and array package 21 are cold plates 36 and 37. The cold plates are also essential in providing a thermal mass and a thermal lag in the system so that the detector can be maintained at a constant temperature with a variation of only about 0.1 degree Celsius. Each of the cold plates is a circular disc approximately ⅛-inch thick whose diameter is less than the inside diameter of housing 30. Cold plate 37 has a ridge covering one of its two major surfaces which is rectangular in cross-section, extends along an entire diameter of the plate, and is about ¼-inch thick and ¼-inch high. Cold plate 37 also has several additional similar ridges parallel to the central ridge, and extending to the perimeter of the disc. Valleys are formed between the ridges. Cold plate 36 has a series of similar ridges positioned so that they interleave with the ridges of cold plate 37. The dimensions of the ridges on the two cold plates are such that there is substantial contact between the two plates. The cold plates are connected together by tie rods 39, which are shown in the form of screws in this embodiment. The portion of the screws between the cold plates are enclosed by elastic expansive means, which in this embodiment are cylindrical springs 50. Since screws 39 are threaded only so as to engage threads in cold plate 36, the springs urge the cold plates apart from one another. Cold plate 36 has a portion, or projection, which extends from the side opposite the ridges, or its unridged major surface, toward array package 21. This portion is denoted cold finger 38. An opening is provided in diode board 31 so that cold finger 38 may touch array package 21. The opening is denoted by 43 on FIG. 5. The space around cold finger 38 contains pins and wiring associated with diode board 31. It can now be seen that the width of the assembly formed by the cold plates and screws is variable and that the springs (not shown) around screws 39 cause cold plate 37 to bear against cooler 22 and cold plate 36 to bear against array package 21. Though not shown in FIG. 3, detector 13 is sealed and provided with an air purge so that it is suitable for use in areas where explosion-proof equipment is required. The laser housing is also sealed and purged. More specifically, the converting apparatus meets the requirements of the National Electric Code for use in Class I, Division 1, Groups C and D areas.

The detector/detector controller may be viewed as a device for converting a visible light pattern to digital form, that is, converting the frequency and intensity information contained in the light pattern to information expressed in a computer-compatible "language" or computer-intelligible electrical impulses. That there are two separate devices termed detector and detector controller is a result of convenience in packaging and the two packages may be viewed as one device. In the development program of the analyzer, it was attempted to incorporate commercially available detector devices, but all had shortcomings. Since the amount of Raman-scattered light is quite small and it is desired to use a relatively low-power light source, the detector must be quite sensitive to very small differences in intensity as well as being capable of recording low intensity light accurately. It must be capable of reading a relatively large area, since a spectrum is resolved into a band which covers a particular area and the band area is considered large by those familiar with applicable sensing apparatus. It must be capable of high resolution, that is, breaking the area read into a sufficient number of discrete and separate elements such that the distinct spectral lines can be perceived. It must be capable of use in an oil refinery environment or other industrial area, outside of temperature controlled areas. This requirement includes ease of maintenance and a rugged design. In the apparatus of this invention, the intensifier and the diode array package may be independently replaced. This is an important feature in that each item is costly. The thermo-electric cooler is also capable of independent replacement. The provisions for adjustment of the diode board in its own plane, mentioned earlier, are necessary to align the two components, so that all of the photo-diode elements receive photons from the intensifier. The provisions for adjustment in a direction normal to the plane it lies in permit the diode array to be positioned directly at the point at which photons are emitted from the intensifier.

In the PNA analyzer, the programs for computers 16 and 17 are in the form of firmware, that is, contained in chips, as is all required operating data. The term "computer" or "computing means" as used herein is meant to refer broadly to a collection of electronics devices used to perform functions such as collecting, storing, comparing, manipulating, and transmitting data and information. A PNA analyzer is in the form of two modules. One module contains com computer 17 and its associated control panel and display 18 while the other, the main module, contains the balance of the apparatus described above plus additonal apparatus as required, such as standard commercial refrigeration apparatus to maintain a constant temperature. The main module is located near a process pipeline. In a refinery or plant, as mentioned above. Connections are provided for a flowing sample stream to enter and exit the module (whereupon it will flow through sample cell 6). A sample handling system may be included with the main module or may be separate from it. Such systems are quite familiar to those skilled in the art and contain components such as a sample reservoir, pumps, pressure safety valves, flow metering devices, pressure regulators, and inert gas blanketing apparatus on an as-needed by the particular application basis. In addition to its more sophisticated functions described herein, computer 16 will perform a number of routine monitoring functions. For example, temperature sensors will be provided to sense an excessively high temperature in the refrigerated main module and at laser 26. These sensors will provide signals to computer 16 which will then cause an alarm on the associated control panel to be activated upon occurrence of high temperatures. These routine functions need not be described here, as it becomes clear to one assembling the apparatus of the invention that certain parameters should be monitored. Choice of parameters to be monitored is dependent upon the particular equipment used in the analyzing apparatus and the use to which the apparatus is to be put.

Description of the method and apparatus of the PNA analyzer is continued. As mentioned above, the Raman spectrum of a sample is recorded in computer 16. More exactly, it is only a portion of the Raman spectrum, as the anti-Stokes lines are removed by filter 9 and there may be very low wave number lines which exceed the capacity of the apparatus. Also, additional portions of the sample spectrum transmitted to the computer are removed in the computer, as will be described. It is convenient and common to visualize spectra expressed in the form of curves, such as those of FIG. 4, in which intensity is plotted against wave length. More commonly, wave number is used in place of wave length, where wave number is the reciprocal of delta wave length, delta referring to the distance between the exciting wave length and the wave length of interest. The description herein refers to manipulation of curves and spectra somewhat interchangeably; it is to be understood that the curves are representative of spectra. Locations of particular peaks of a sample spectrum and their heights are compared to peak locations and heights of known substance spectra, the known spectra having previously been recorded from samples whose compositions were known. Generally, when the peak locations coincide, or are at substantially the same wave lengths, it can be concluded that the sample contains the known substances. The quantities of components of the sample are determined by comparing peak areas. As is explained in more detail herein, the term peak is often used in referring to a spectral response region and peak height may be replaced by peak area or spectral response region area.

Each spectrum recorded in the computer is adjusted to eliminate portions capable of affecting analysis accuracy, that is, false information. To eliminate portions comprised of sample fluorescence and stray photons, a baseline is established and that portion of the spectrum below the baseline is discarded, or ignored in accomplishing the analysis. A valley search method is used to establish a baseline. The lowest point in each of three areas, or windows, is determined. A window is located at each end of the spectrum and one in the middle. A provisional baseline is then drawn connecting the three points with two straight line segments. A search is then made for points of the spectrum curve which are below the provisional baseline. If any are found, the affected part of the provisional baseline is replaced by line segments connecting those points with the three initially found low points. Of course, there are alternative methods of establishing a baseline, including drawing an arbitrary line without reference to the data.

A background spectrum is obtained and stored in the computer. The background spectrum may be characterized as comprising amplifier dark count noise and ambient photons. It is obtained in the same manner as a sample spectrum but with shutter 4 closed so that the beam of photons is prevented from reaching the sample. The background spectrum is subtracted from the sample spectrum; at each frequency, the spectrum intensities are subtracted. As described above, photodiode array package 21 comprises 1024 light sensitive diodes, each paired with a dummy diode which is not light sensitive. The outputs of the dummy diodes may be subtracted from the outputs of the light sensitive diodes in order to correct for dark current and thus obtain a more accurate spectrum and analysis. The dark count noise component of a background spectrum serves substantially the same purpose as the dummy diode outputs. Either method or both methods may be used to adjust spectra.

We claim as our invention:

1. Apparatus for converting weak light to electrical signals descriptive of said light, said converting apparatus being capable of sensing differences inphoton flux over an area of detection, comprising:
   (a) a housing to contain elements comprising said converting apparatus, the housing having an entrance aperture through which photons pass;
   (b) means for sending the number of photons passing through said aperture, said photon sensing means being comprised of a plurality of sensing elements, where each element provides an intermittent electrical signal corresponding to the total number of photons incident upon it over a time period;
   (c) means for holding in position and adjusting the position of said photon sensing means comprising, in cooperative combination:
      (i) a diode board to which said photon sensing means are affixed, the diode board having an opening in its center area and a plurality of tie rod openings;
      (ii) a plurality of tie rods affixed at one end to the housing, each tie rod slidably passing through one of said tie rod openings in the diode board and being normal to the diode board, and at least a portion of the tie rods having retaining means at their non-affixed ends;
      (iii) first elastic expansive means located between the diode board and said retaining means, said first elastic expansive means urging the diode board toward said entrance aperture; and,
      (iv) a plurality of alternate tie rod attachment points on the housing, such that the diode board may be adjusted in the plane in which it lies by repositioning one or more tie rods to an alternate attachment point or to an alternate attachment point and another tie rod opening;
   (d) means for removing heat from said converting apparatus; and,
   (e) means for providing a heat sink and a thermal path to said heat removal means comprising, in cooperative combination:
      (i) a first cold plate and a second cold plate disposed within the housing, each cold plate having one of its two major surfaces partially covered by a series of ridges parallel to one another with valleys being formed between the ridges, with the ridges being disposed and dimensioned in such a manner that the ridges of the first cold plate are interleaved with the ridges of the second cold plate to at least partially fill the valleys of each plate and provide substantial contact between the plates, and with the first cold plate having a projection extending from its unridges major surface toward said photon sensing means;

(ii) a plurality of tie rods, each tie rod having one end affixed to a cold plate, all tie rods being affixed to the same cold plate, and each rod slidably passing through an opening in the other cold plate; and, (iii) second elastic expansive means located between the first and second cold plates, said second elastic expansive means urging the cold plates apart and urging said projection extending from the unridged major surface of said first cold plate into contact with said photon sensing means through the opening in the center area of the diode board.

2. The apparatus of claim 1 further comprising means for intensifying said light pattern.

3. The apparatus of claim 1 further characterized with respect to the means of (c) (iii) in that said first elastic expansive means are a plurality of cylindrical springs located such that a spring surrounds a portion of the length of each of at least a portion of the tie rods.

4. The apparatus of claim 1 further characterized with respect to the means of (e) (iii) in that said second elastic expansive means are a plurality of cylindrical springs located such that a spring surrounds a portion of the length of each of at least a portion of the tie rods.

5. The apparatus of claim 1 further characterized in that said means for removing heat is located within said housing.

6. The apparatus of claim 1 further characterized in that said means for removing heat is a thermo-electric cooler.

7. The apparatus of claim 1 further characterized in that said photon sensing means are a photo-diode array package.

8. The apparatus of claim 1 further comprising electronic apparatus for accomplishing the functions of providing electric power to operate the converting apparatus, communicating with a computer, controlling temperature of the converting apparatus, controlling read-out of said intermittent electrical signals, conditioning signals, and controlling operation of the converting apparatus.

9. The apparatus of claim 1 further characterized in that said electrical signals are in digitized form.

* * * * *

UNITED STATES PATENT AND TRADEMARK OFFICE
CERTIFICATE OF CORRECTION

PATENT NO. : 4,575,629
DATED : March 11, 1986
INVENTOR(S) : Schnell et al.

It is certified that error appears in the above-identified patent and that said Letters Patent is hereby corrected as shown below:

Column 12: line 20, change "inphoton" to --in photon--; and,
line 25, change "sending" to --sensing--.

Signed and Sealed this

Twenty-sixth Day of August 1986

[SEAL]

Attest:

DONALD J. QUIGG

Attesting Officer    Commissioner of Patents and Trademarks